US009593638B2

United States Patent
Pursifull

(10) Patent No.: US 9,593,638 B2
(45) Date of Patent: Mar. 14, 2017

(54) FUEL INJECTOR CHARACTERIZATION

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 14/490,427

(22) Filed: Sep. 18, 2014

(65) Prior Publication Data
US 2016/0084189 A1   Mar. 24, 2016

(51) Int. Cl.
| F02B 3/00 | (2006.01) |
| F02D 41/38 | (2006.01) |
| F02M 63/02 | (2006.01) |
| F02B 3/06 | (2006.01) |
| F02B 1/12 | (2006.01) |
| F02D 41/40 | (2006.01) |
| F02D 41/30 | (2006.01) |
| F02D 41/00 | (2006.01) |

(52) U.S. Cl.
CPC ..... *F02D 41/3809* (2013.01); *F02D 41/0025* (2013.01); *F02D 41/3863* (2013.01); *F02M 63/0205* (2013.01); *F02M 63/0265* (2013.01); *F02M 63/0285* (2013.01); *F02B 1/12* (2013.01); *F02B 3/06* (2013.01); *F02D 41/0085* (2013.01); *F02D 41/3035* (2013.01); *F02D 41/402* (2013.01); *F02D 41/403* (2013.01); *F02D 41/406* (2013.01); *F02D 2041/3881* (2013.01); *F02D 2200/0602* (2013.01); *F02D 2200/0606* (2013.01); *F02D 2200/0614* (2013.01)

(58) Field of Classification Search
CPC .... F02D 41/402; F02D 41/43; F02D 41/3035; F02B 3/06
USPC ........................................................ 123/299
See application file for complete search history.

(56) References Cited

U.S. PATENT DOCUMENTS

| 4,795,217 A * | 1/1989 | Hilaris ...................... E21B 7/18 239/120 |
| 5,176,122 A * | 1/1993 | Ito ....................... F02D 41/2438 123/447 |
| 6,349,702 B1 | 2/2002 | Nishiyama |
| 6,964,261 B2 | 11/2005 | Warne et al. |
| 7,841,319 B2 | 11/2010 | Thomas |

(Continued)

FOREIGN PATENT DOCUMENTS

EP     2453123 A1    5/2012

OTHER PUBLICATIONS

Surnilla, Gopichandra et al., "Method of Diagnosing Injector Variability in a Multiple Injector System," U.S. Appl. No. 14/098,363, filed Dec. 5, 2013, 37 pages.

*Primary Examiner* — Lindsay Low
*Assistant Examiner* — Charles Brauch
(74) *Attorney, Agent, or Firm* — Julia Voutyras; John D. Russell; B. Anna McCoy

(57) ABSTRACT

Various methods are provided for characterizing fuel injector operation. In one embodiment, a method of characterizing fuel injector operation comprises determining a flow error of a single fuel injector of two or more fuel injectors positioned in a first fuel rail by comparing a sum of each of a plurality of injector commands for the single injector to a fuel amount pumped into the first fuel rail, the fuel amount being predetermined.

20 Claims, 6 Drawing Sheets

(56) References Cited

U.S. PATENT DOCUMENTS

| | | | |
|---|---|---|---|
| 8,118,006 B2 | 2/2012 | Pursifull | |
| 2008/0236549 A1* | 10/2008 | Bickley | F02C 7/232 123/504 |
| 2011/0023818 A1* | 2/2011 | Fulton | F02M 55/025 123/295 |
| 2013/0104850 A1* | 5/2013 | Long | F02B 19/12 123/445 |

* cited by examiner

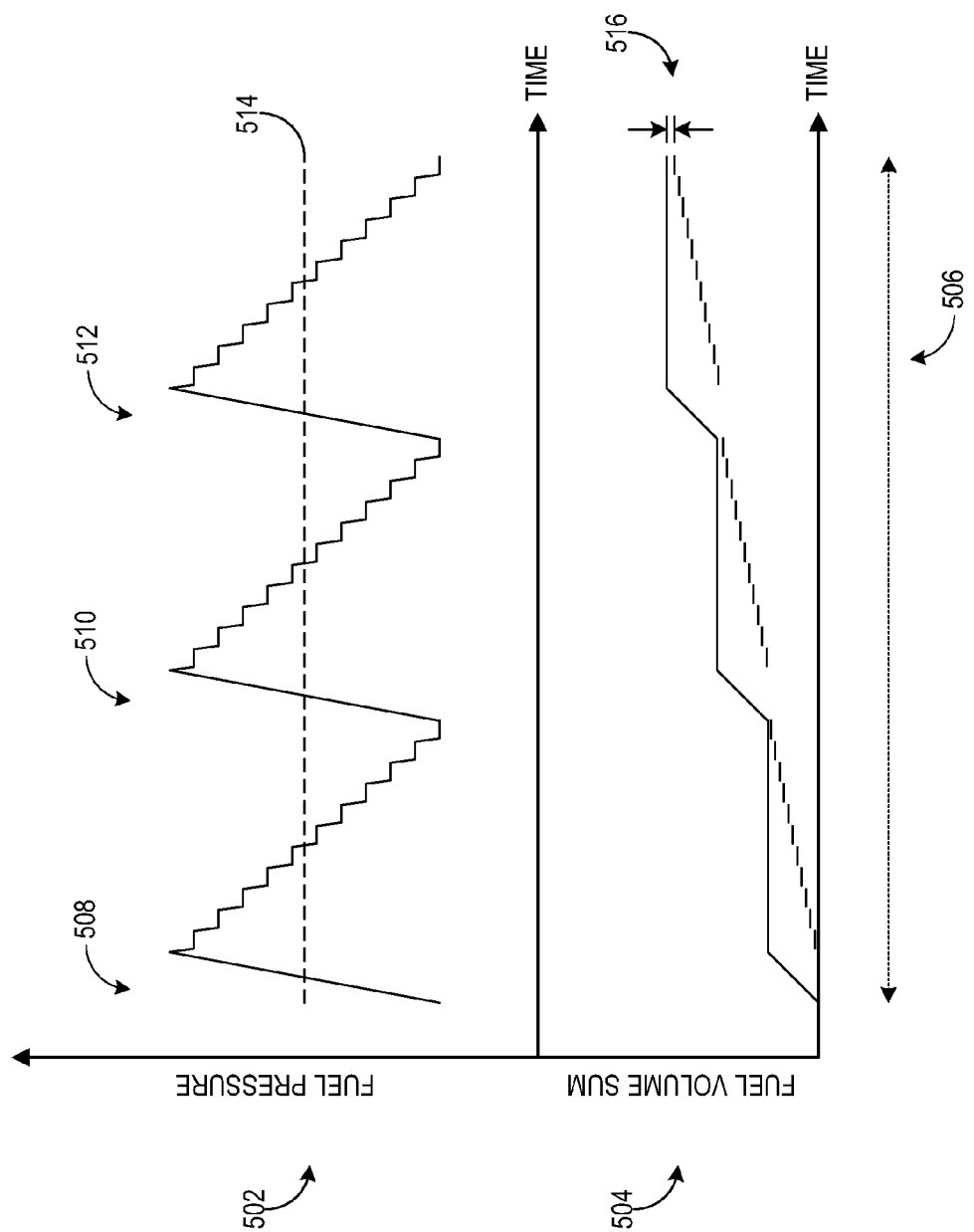

FUEL INJECTOR CHARACTERIZATION

FIELD

The field of the disclosure generally relates to fuel injection in an internal combustion engine, and particularly to characterization of fuel injector operation.

BACKGROUND AND SUMMARY

Fuel injectors often have piece-to-piece and time-to-time variability, due to imperfect manufacturing processes and/or injector aging (e.g., clogging), for example. This injector variability may cause cylinder torque output imbalance due to the different amount of fuel injected into each cylinder, and may also cause higher tail pipe emission and reduced fuel economy due to an inability to correctly meter the fuel to be injected into each cylinder.

U.S. Pat. No. 7,841,319 discloses methods of characterizing the operation of direct injection fuel injectors and mitigating inaccuracy in fuel injection. In particular, deactivation of a fuel pump may be followed by commanding a fuel injector to inject a given fuel quantity. Based on the resulting pressure drop in the fuel rail, the actual fuel quantity injected is computed. By comparing the commanded fuel quantity to the actual fuel quantity injected, fuel injector operation may be diagnosed and/or compensated to mitigate inaccuracy in fuel metering.

The inventors herein have identified an issue with the above approach. Specifically, sampling of fuel rail pressures in the crank angle domain is performed. As such, other tasks are also performed in the crank angle domain, such as filtering. As these actions are performed on an event basis, they yield additional computational cost and complexity relative to analogous actions that may be performed in the time domain. These issues are exacerbated by the effort expended to reconcile crank angle actions with time domain actions.

One approach that at least partially addresses the above issues includes a method of characterizing fuel injector operation, comprising determining a flow error of a single fuel injector of two or more fuel injectors positioned in a first fuel rail by comparing a sum of each of a plurality of injector commands for the single injector to a fuel amount pumped into the first fuel rail, the fuel amount being predetermined.

In a more specific example, each of the plurality of injections is performed between successive full pump strokes performed by a fuel pump, the fuel pump supplying fuel to the two or more fuel injectors in the first fuel rail.

In another aspect of the example, each of the plurality of injections occurs after the fuel pump has performed a full pump stroke and pumping by the fuel pump following the full pump stroke has been suppressed.

In this way, the operation of fuel injectors may be individually characterized and specific fuel injectors flow errors compensated, increasing fuel metering accuracy. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows plots of fuel pressure and fuel volume sum, both as functions of time, for an example fuel injector characterization period.

DETAILED DESCRIPTION

As described above, fuel injectors often exhibit physical and temporal variability due to imperfect manufacturing processes and/or injector aging, for example. Such variability can result in inaccurate fuel metering by a fuel injector, in turn leading to engine imbalance, increased emissions, and/or reduced fuel economy. In some approaches, fuel injector operation may be characterized by deactivating a fuel pump, commanding a fuel injector to inject a determined fuel quantity thereafter, and measuring the resultant fuel pressure drop in the fuel rail. By comparing the commanded fuel quantity to the actual fuel quantity injected, fuel injector operation may be diagnosed and/or compensated to mitigate inaccuracy in fuel metering.

Figure 1:
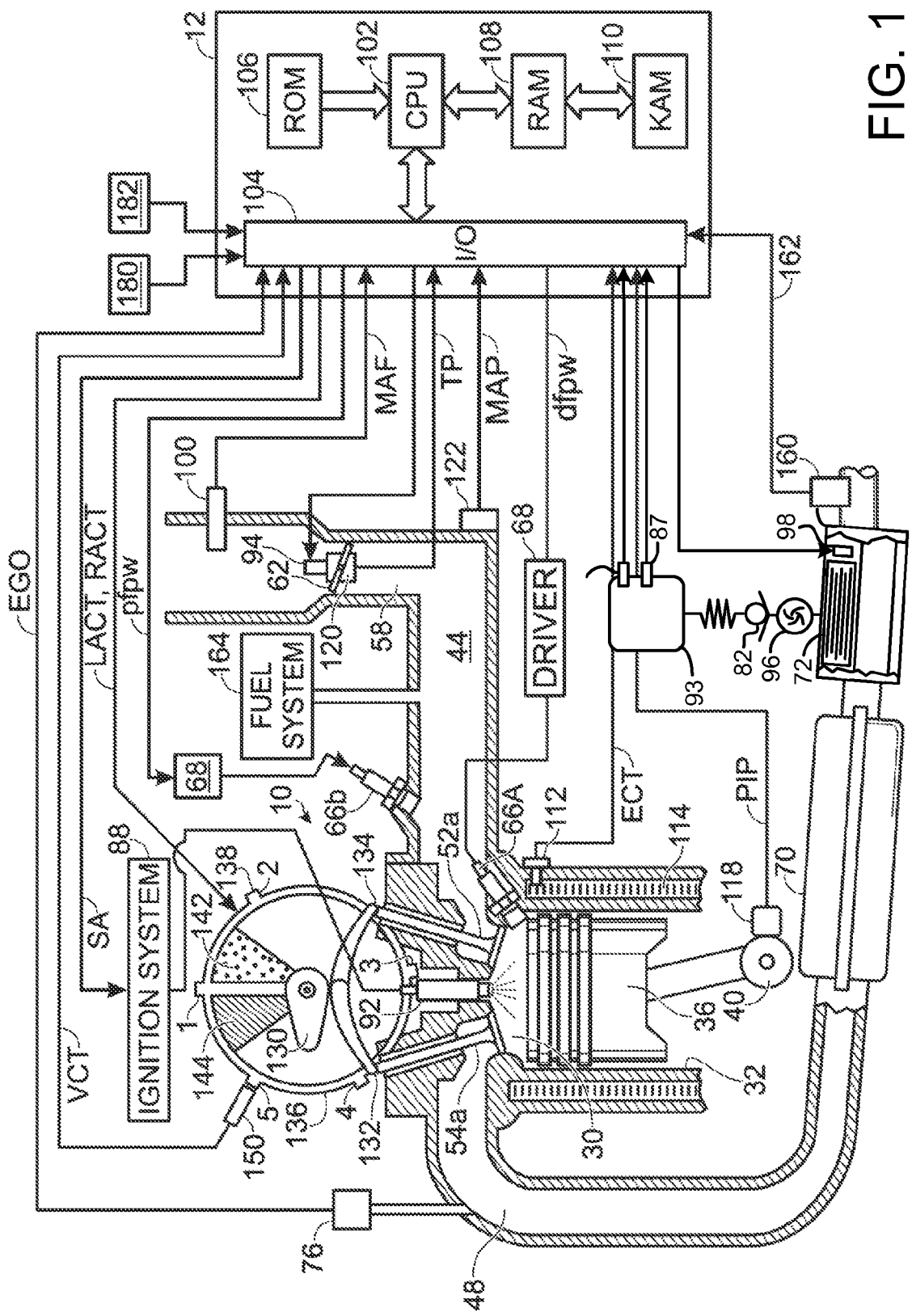
FIG. 1 schematically depicts an example cylinder of an internal combustion engine.
Figure 2:
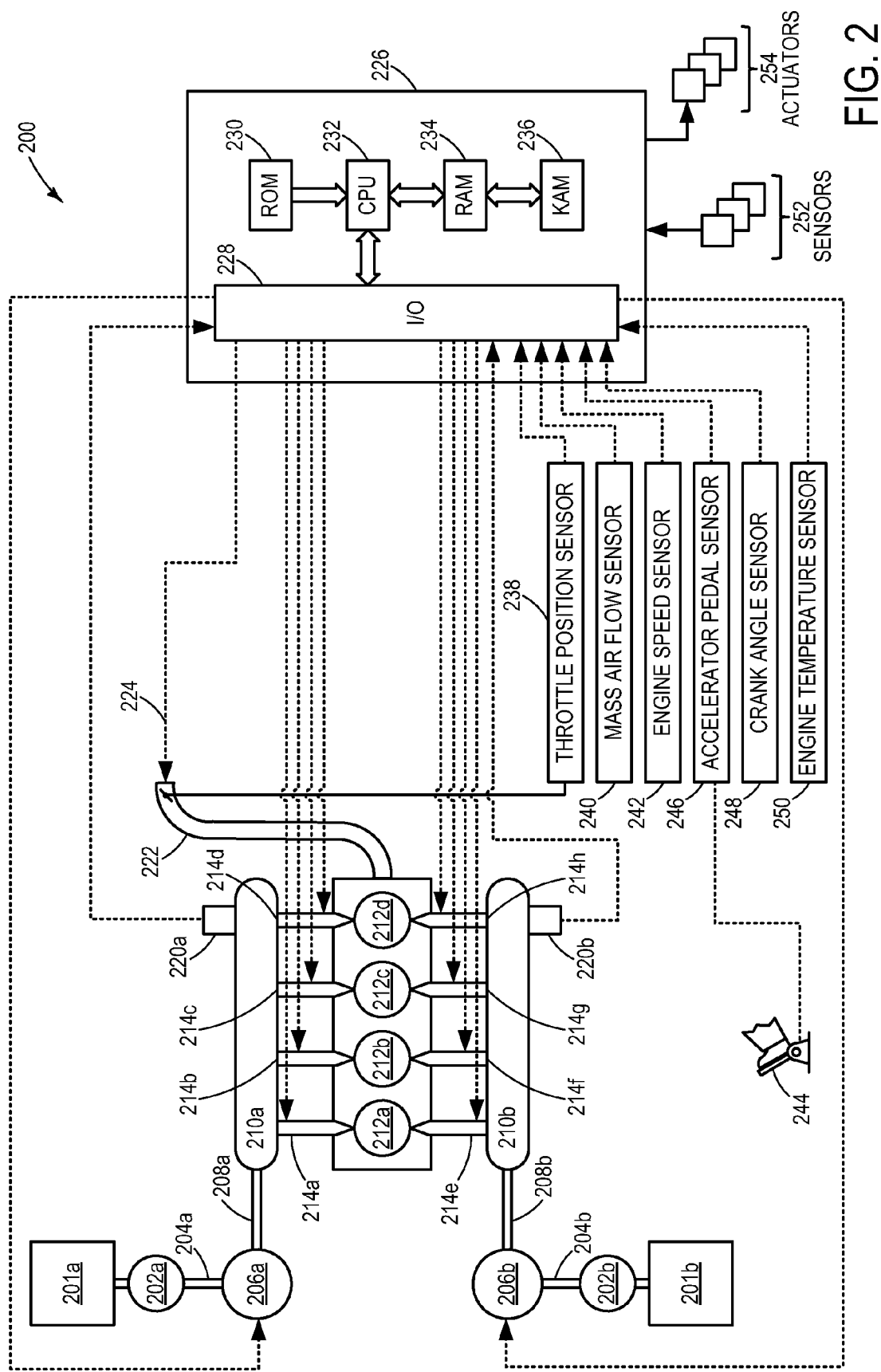
FIG. 2 illustrates a fuel injection system with a high pressure dual fuel rail system.

Various methods are thus provided for characterizing fuel injector operation. In one embodiment, a method of characterizing fuel injector operation comprises determining a flow error of a single fuel injector of two or more fuel injectors positioned in a first fuel rail by comparing a sum of each of a plurality of injector commands for the single injector to a fuel amount pumped into the first fuel rail, the fuel amount being predetermined. FIG. 1 schematically depicts an example cylinder of an internal combustion engine, and FIG. 2 illustrates a fuel injection system with a high pressure dual fuel rail system. The engines of FIGS. 1 and 2 also include a controller configured to carry out the methods depicted in FIGS. 3 and 4. FIG. 5 shows plots of fuel pressure and fuel volume sum, both as functions of time, for an example fuel injector characterization period.

FIG. 1 shows one cylinder of a multi-cylinder engine, as well as the intake and exhaust path connected to that cylinder. In the embodiment shown in FIG. 1, engine 10 is capable of using two different substances, and/or two different injectors in one example. For example, engine 10 may use gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. Further, as another example, engine 10 may use one fuel or fuel blend (e.g., gasoline or gasoline and ethanol) and one mixture of water and fuel (e.g., water and methanol). As another example, engine 10 may use gasoline and a reformate fuel generated in a reformer coupled to the engine. In another example, two fuel systems are used, but each uses the same fuel, such as gasoline. In still another embodiment, a single injector (such as a direct injector) may be used to inject a mixture of gasoline and an alcohol based fuel, where the ratio of the two fuel quantities in the mixture may be adjusted by controller 12 via a mixing valve, for example. In still another example, two different injectors for each cylinder are used, such as port and direct injectors. In even another embodiment, different sized injectors, in addition to different locations and different fuels, may be used.

FIG. 1 shows one example fuel system with two fuel injectors per cylinder, for at least one cylinder. Further, each cylinder may have two fuel injectors. The two injectors may be configured in various locations, such as two port injectors, one port injector and one direct injector (as shown in FIG. 1), or others.

Continuing with FIG. 1, it shows a dual injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (shown in FIG. 2) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44.

Further, engine 10 may include fuel reformer 97 with storage tank 93 for supplying a gaseous fuel to one or both fuel injectors 66a and 66b. Gaseous fuel may be supplied to one or both fuel injectors from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. In some embodiments, check valve 82 may be positioned upstream of pump 96. In other embodiments, check valve 82 may be positioned in parallel with pump 96. Further, check valve 82 may instead be an actively controlled valve. In such an embodiment, the actively controlled valve would be opened when the pump is operating. The control signal to pump 96 may be a simple on/off signal, for example. In other examples, the control signal may be a continuously variable voltage, current, pulsewidth, desired speed, or desired flowrate, etc. Further, pump 96 may be turned off, slowed down, or disabled with one or more bypass valves (not shown).

Fuel reformer 97 includes catalyst 72 and may further include optional electrical heater 98 for reforming alcohol supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic dehydrogenation of alcohol supplied by fuel tank 91 and to promote fuel reformation.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In some examples, controller 12 receives various sensed operating parameters that may be used to monitor the fuel pressure in a fuel rail of a fuel system. The operating parameters may be correlated to pressure changes in the fuel rail during fuel injector calibration events and/or fuel pump strokes. The effect of the engine operating parameters on the fuel rail pressure measurements may be removed or discounted so that the fuel pressure changes attributed to these events can be accurately determined. Such engine parameters that may influence fuel pressure measurements include for example intake and/or exhaust valve positions, crank angle position, piston position, firing of injector, firing of spark ignition, and/or intake and/or exhaust pressure. As described in further detail below with reference to FIGS. 4 and 5, the total fuel injected by the fuel injectors in a given time interval may be compared to the actual fuel injected determined based on operation of a fuel pump that supplies fuel to the fuel injectors. Controller 12 may determine fuel injector commands (e.g., fuel amounts to be injected) based on one or more of engine load, engine speed, throttle position, etc., for example.

Continuing with FIG. 1, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and it will be understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

FIG. 2 illustrates a fuel injection system 200 with a high pressure dual fuel rail system which may be the fuel system coupled to engine 10 in FIG. 1, for example. The system 200 may include fuel tanks 201a and 201b, low pressure (or lift) fuel pumps 202a and 202b that supply fuel from the fuel tanks 201a and 201b to high pressure fuel pumps 206a and 206b via low pressure passages 204a and 204b, respectively. The high pressure fuel pumps 206a and 206b supply pressurized fuel to the high pressure fuel rails 210a and 210b via high pressure passages 208a and 208b, respectively. The high pressure fuel rail 210a supplies pressurized fuel to fuel injectors 214a, 214b, 214c, and 214d and the high pressure fuel rail 210b supplies pressurized fuel to fuel injectors 214e, 214f, 214g, and 214h. Low pressure fuel pumps 202a and 202b may increase fuel pressure to a moderate level (e.g., approximately 4 bar), while high pressure fuel pumps 206a and 206b may increase fuel pressure to a substantially higher pressure level (e.g., approximately 50-100 bar), for example. The fuel injectors inject fuels into engine cylinders 212a, 212b, 212c, and 212d located in an engine block 216. Un-injected fuel may be returned to the fuel tanks 201a and 201b via respective fuel return passages (not shown). The engine block 216 may be coupled to an intake pathway 222 with an intake air throttle 224. System 200 thus includes first and second fuel pumps, first and second fuel rails, first and second sets of fuel injectors, etc.

In some implementations, fuel tanks 201a and 201b may hold fuel with different fuel qualities, such as different fuel compositions. These differences may include different alcohol content, different octane, different heat of vaporizations, different fuel blends, and/or combinations thereof, etc. Further, one or both of fuel tanks 201a and 201b may each store two or more fuels—e.g., a gaseous fuel solubilized in a liquid fuel.

The system may further include a control unit 226. Similar to control unit 12 in FIG. 1, the control unit may be further coupled to various other sensors 252 and various actuators 254 (e.g., fuel injection actuator, spark ignition actuator, throttle valve actuator, etc.) for sensing and controlling vehicle operating conditions. For example, the control unit 226 may sense engine speed, throttle position, intake temperature and/or pressure, exhaust temperature/pressure, mass air flow, engine coolant temperature, crank angle position, variable cam position, injection timing, spark ignition timing through appropriate sensors. The control unit 226 may also control operations of intake and/or exhaust valves or throttles, engine cooling fan, spark ignition, injector, and fuel pumps to control engine operating conditions.

FIG. 2 shows additional details of the fuel injection system. Specifically, FIG. 2 shows control unit 226, which may be an engine control unit, powertrain control unit, control system, a separate unit, or combinations of various control units. The control unit 226 is shown in FIG. 2 as a microcomputer, including an input/output (I/O) port 228, a central processing unit (CPU) 232, an electronic storage medium for executable programs and calibration values shown as read only memory (ROM) chip 230 in this particular example, random access memory (RAM) 234, keep alive memory (KAM) 236, and a data bus.

The control unit 226 may receive signals from various sensors. For example, the control unit 226 may receive fuel pressure signals from the high pressure fuel rails 210a and 210b via respective fuel pressure sensors 220a and 220b located in the high pressure fuel rails 210a and 210b. The control unit may further receive throttle opening angle signals ($O_A$) indicating the intake air throttle position via a throttle position sensor 238, intake air flow signals ($Q_A$) from a mass air flow sensor 240, engine speed signals ($N_e$) from engine speed sensor 242, accelerator pedal position signal from a pedal 244 via an accelerator pedal position sensor 246, crank angle sensor 248, and engine coolant temperature (ECT) signals from engine temperature sensor 250.

In addition to the signals mentioned above, the control unit 226 may also receive other signals from various other sensors 252. For example, the control unit 226 may receive a profile ignition pickup signal (PIP) from a Hall effect sensor (not shown) coupled to a crankshaft and a manifold pressure signal MAP from a manifold pressure sensor, as shown in FIG. 1.

The control unit 226 may control operations of various vehicular components via various actuators 254. For example, the control unit 226 may control the operation of the fuel injectors 214a-h through respective fuel injector actuators (not shown) and high pressure fuel pumps 206a and 206b through respective high pressure fuel pump actuators (not shown).

The high pressure fuel pumps 206a and 206b may be coupled to and controlled by the control unit 226 as is shown in FIG. 2. The control unit 226 may regulate the amount or speed of fuel to be fed into the high pressure rails 210a and 210b by the high pressure fuel pumps 206a and 206b through respective high pressure fuel pump controls (not shown). In some examples, the high pressure fuel pumps 206a and 206b may have adjustable pump strokes that may be adjusted by the control unit 226 to vary changes in fuel pressure. The control unit 226 may also completely stop fuel supply to the high pressure fuel rails 210a and 210b. Furthermore, the high pressure fuel pumps 206a and 206b may contain one or more relief valves that decrease the fuel pressure in the high pressure fuel rails when the fuel pressure in the high pressure fuel rails 210a and 210b is higher than desired.

Although the injectors are coupled to engine cylinders in this example, in other examples, the injectors may be coupled to an intake pathway. The fuel injectors that are directly coupled to engine cylinders may be located overhead of cylinder pistons (not shown) or located on the side of an engine cylinder. The injectors 214a-h may be operatively coupled to and controlled by a control unit, such as the control unit 226, as is shown in FIG. 2. An amount of fuel injected from the injector and the injection timing may be determined by the control unit 226 from an engine map stored in the control unit 226 on the basis of engine speed (NO, intake throttle angle ($Q_A$), and/or engine load, among other parameters. The injector may be controlled by controlling an electromagnetic valve coupled to the injector (not shown). The injector may not inject all the fuel supplied to the injector and may return part of the fuel supplied to the fuel tank through a return path, such as a return passage (not shown).

The high pressure fuel rails 210a and 210b may also contain one or more temperature sensors for sensing the fuel temperature in the high pressure fuel rails 210a and 210b and one or more pressure sensors for sensing the fuel pressure in the high pressure fuel rails 210a and 210b. They may also contain one or more relief valves that when opened decrease the pressure in the high pressure fuel rails when it is greater than desired and return extra fuel back to the fuel tank via a fuel return passage.

Various other modifications or adjustments may be made to the above example systems. For example, the fuel passages (e.g., 204a, 204b, 208a, and 208b) may contain one or more filters, pumps, pressure sensors, temperature sensors, and/or relief valves. Two or more high and/or low pressure fuel pumps may supply fuel to a given fuel rail. The fuel passages may include one or multiple lines. There may be one or more fuel cooling systems. The intake pathway 222 may contain one or more air filters, turbochargers, and/or surge tanks. The engine may contain one or more engine cooling fans, cooling circuits, spark ignitions, valves, and controls. The engine may be coupled to an exhaust pathway. Although not shown in FIG. 2, in some examples fuel system 200 may include high pressure fuel reserves associated with fuel rails 210a and 210b, respectively. The fuel reserves may be positioned downstream of their respective high pressure fuel pumps. In this case, control unit 226 the amount and/or speed of fuel fed into the fuel reserves. Further, one or more relief valves may be included in the fuel reserves to control fuel pressure within the fuel reserves.

As described in further detail below, control unit 226 may determine fuel injector commands (e.g., fuel amounts to be injected by the fuel injectors) throughout engine operation. These determined fuel amounts may be tracked and stored (e.g., in one or more of ROM 230, RAM 234, and KAM 236) in a suitable time interval so that they may be compared with the actual total fuel amount injected during the time interval. The actual fuel amount injected may correspond to a fuel volume pumped into a fuel rail by a fuel pump. This fuel volume may be determined based on a predetermined fuel volume known or assumed to be pumped into the fuel rail according to the pump command issued to high pressure fuel pumps 206a and 206b. In some examples, high pressure fuel pumps 206a and 206b may controlled such that a relatively constant mean fuel pressure is maintained in high pressure fuel rails 210a and 210b, respectively, and such that full pump strokes are commanded—e.g., the maximum output of fuel pumps 206a and 206b are commanded, with the corresponding maximum achievable fuel amounts thereby pumped into the high pressure fuel rails. Fuel volumes predetermined offline in a testing environment, for example, corresponding to the full pump strokes may be taken as the fuel volumes actually pumped into fuel rails 210a and 210b as a result of issuing the full pump strokes. Fuel volumes pumped as a result of full pump strokes may be considered to be functions of a difference between fuel rail pressure and high pressure fuel pump inlet pressure, and the reciprocal of engine speed, for example. Differences between the injector commands (e.g., commanded fuel amounts) and fuel amounts pumped into the fuel rail by the fuel pump may be determined and analyzed to characterize fuel injector operation (e.g., to identify fuel injector degradation and/or to compensate errors in fuel injection). Pumped fuel volumes corresponding to pump strokes other than the full pump stroke may be predetermined in the manner described herein, however, for example in an offline testing environment in which pumped fuel volumes are determined for a plurality of corresponding pump strokes. In some examples, the predetermined data may include one or more pumped fuel volumes each associated with corresponding pump stroke commands. By determining pumped fuel volumes in this way, the cost and complexity of fuel volume sensing may be reduced, as in some scenarios actual fuel volumes pumped into the fuel rails may be determined based on predetermined data to a highly accurate degree. In some implementations, however, output from fuel pressure sensors 220a and 220b may be used to determine pumped fuel amounts, in addition to or in lieu of the predetermined pumped fuel volume data.

Figure 3:
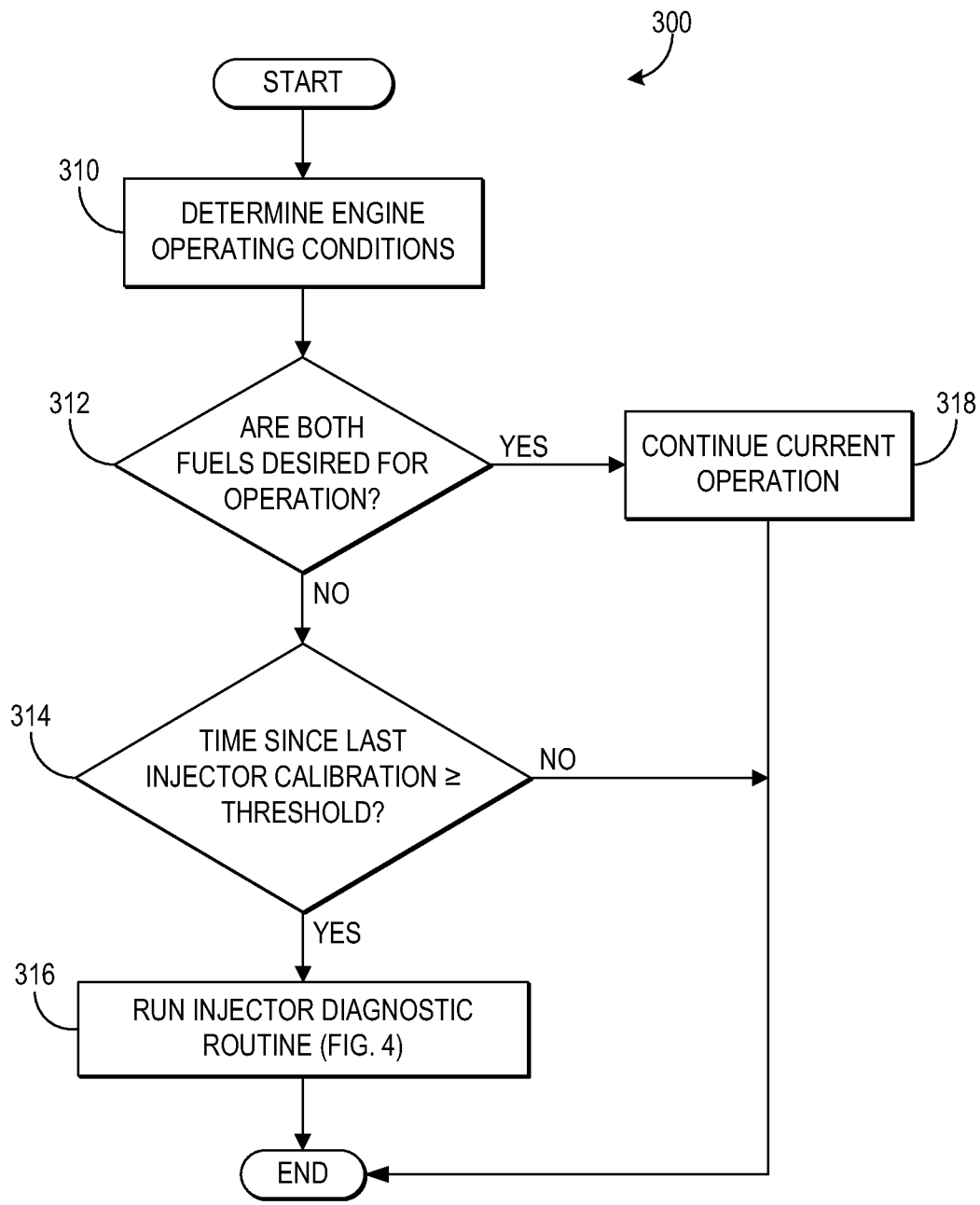
FIG. 3 shows a flowchart illustrating a routine for determining whether a fuel injector characterization routine is performed.

Turning now to FIG. 3, a flowchart illustrating a routine 300 for determining whether a fuel injector characterization routine is performed. Specifically, routine 300 determines if a characterization routine is desired based on which fuels are desired for engine operation and an amount of time since the last injector calibration. For example, during conditions in which both fuels are needed, a characterization routine may not be run since injection of one of the fuels is suspended one of the cylinders. Routine 300 may be stored as machine-readable instructions in a non-transitory storage medium, such as one or more of ROM 230, RAM 234, and KAM 236 of control unit 226, for example, and may be used to determine whether one or more of fuel injectors 214a-h are characterized.

At 310 of routine 300, engine operating conditions are determined. Engine operating conditions may include load, temperature, speed, etc.

At 312 of routine 300, it is determined whether both fuels are desired for engine operation. For example, if the engine is operating at high load, injection of both fuels may be desired in order to continue operating at high load. As another example, the engine may be operating under low load conditions and the engine may operate using one or both fuels. If it is determined that both fuels are desired (YES), routine 300 proceeds to 318 where current engine operation is continued and the routine ends. On the other hand, if it is determined that both fuels are not desired for operation (NO) (e.g., one or both fuels may be used, but both fuels are not needed for optimum engine efficiency), routine 300 continues to 314 where it is determined if the time since the last injector characterization is greater than or equal to a threshold. As examples, injector characterization may be desired one or more times per drive cycle, every other drive cycle, or after a predetermined number of miles is driven.

If the time since the last injector characterization is not greater than or equal to the predetermined threshold (NO), routine 300 ends. In contrast, if the time since the last injector calibration is greater than or equal to the predetermined threshold (YES), routine 300 proceeds to 316 and an injector characterization routine is carried out, as will be described below with reference to FIG. 4.

It will be appreciated that other conditions may be evaluated when determining whether injector characterization is performed. For example, in some embodiments injector characterization may not be performed if engine load exceeds a threshold load. Alternatively or additionally, injector characterization may not be performed if engine temperature exceeds a threshold temperature. Under some conditions, it may be desirable to eschew injector characterization in the presence of low engine temperature conditions (e.g., at startup), as fluctuating engine temperatures may affect fuel mass injected at a given pressure, leading to inaccurate fuel metering and degraded injector characterization.

Figure 4A:
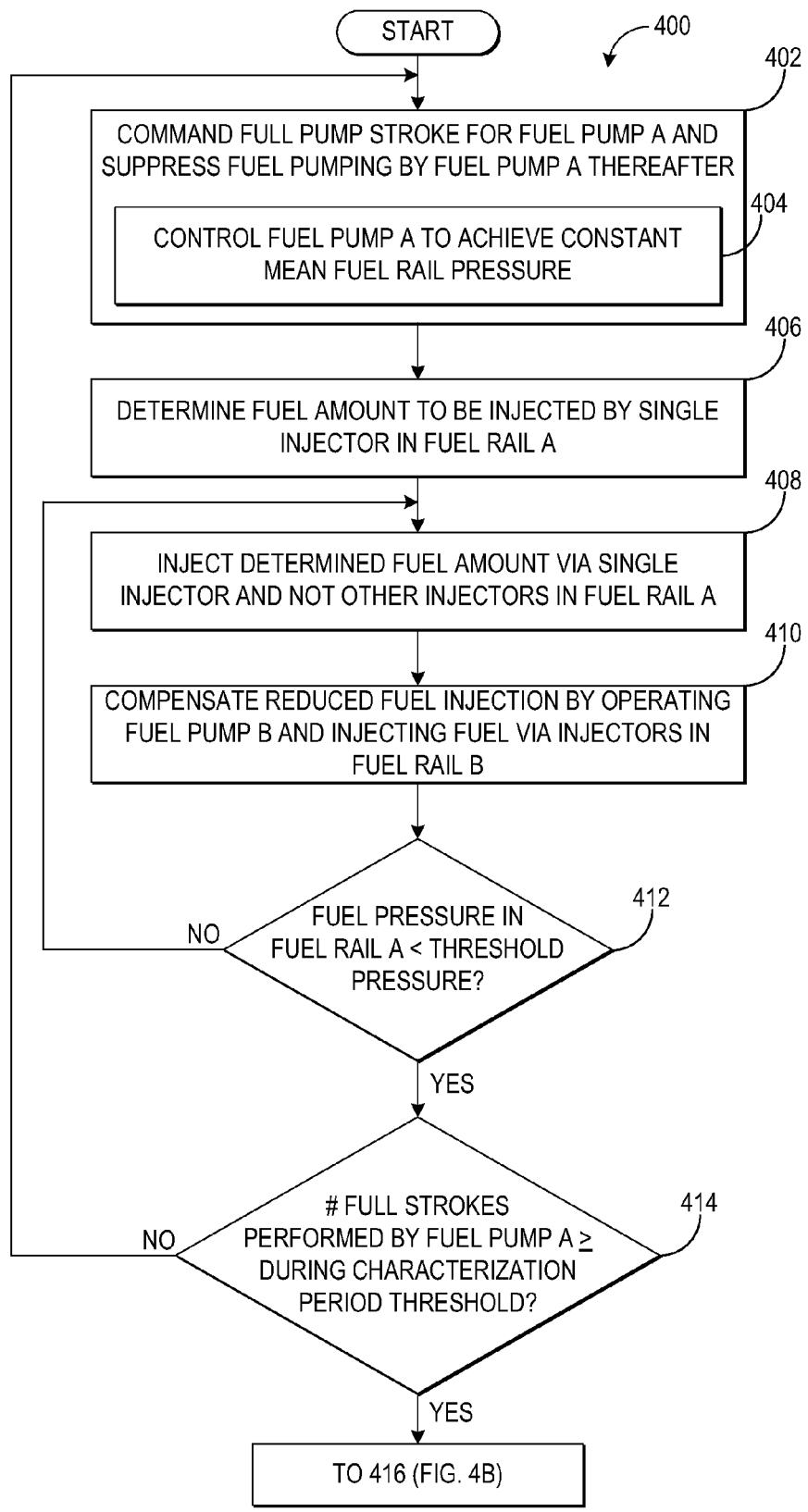
FIGS. 4A and 4B show a flowchart illustrating a routine for characterizing fuel injector operation.

Turning now to FIG. 4, a flowchart illustrating a routine 400 for characterizing fuel injector operation is shown. Routine 400 may be stored as machine-readable instructions in a non-transitory storage medium, such as one or more of ROM 230, RAM 234, and KAM 236 of control unit 226, for example, and may be used to characterize the operation of one or more of fuel injectors 214a-h, all with reference to FIG. 2. Routine 400 is described with reference to a dual fuel system that includes fuel pumps A and B (e.g., high pressure fuel pumps 206a and 206b of FIG. 2), fuel rails A and B (e.g., 208a and 208b) receiving fuel from fuel pumps A and B, respectively, and injector groups A and B (e.g., fuel injectors 214a-d and fuel injectors 214f-h) positioned in fuel rails A and B, respectively. By heterogeneously operating fuel systems A and B, fuel metering inaccuracy in one or more fuel injectors may be identified and/or compensated.

At 402 of routine 400, a full pump stroke for fuel pump A is commanded, and, thereafter, fuel pumping by fuel pump A is suppressed. As used herein, the full pump stroke refers to the maximum output of a fuel pump (e.g., fuel pump A) that may be achieved and that results in the supply of a maximum achievable amount of fuel to a corresponding fuel rail (e.g., to fuel rail A from fuel pump) that may be achieved for a given set of physical conditions (e.g., temperature, pressure, etc.). The full pump stroke of fuel pump A may be commanded as opposed to pump strokes less than the full pump stroke, as, in some examples the full pump stroke may be the most accurate pump stroke—that is, the full pump stroke has the closest correspondence to a resulting fuel amount supplied to fuel rail A, whereas other supplied fuel amounts resulting from other non-full pump strokes do not correspond as directly to their respective non-full pump strokes. After commanding the full pump stroke for fuel pump A, fuel pumping by fuel pump A is suppressed so that a fuel volume pumped into fuel rail A by fuel pump A via the full pump stroke may be compared to the amount of the fuel volume injected by the fuel injectors in fuel rail A. As described above, a resulting fuel volume pumped as a consequence of commanding the full pump stroke may be predetermined, such that the resulting fuel volume pumped is determined by accessing memory storing and associating the pumped fuel volume with the commanded pump stroke.

Commanding the full pump stroke for fuel pump A may include, at 404, controlling fuel pump A to achieve a constant mean fuel pressure in fuel rail A. The mean fuel pressure may be defined throughout various suitable time intervals—for example, from the time a full pump stroke is commanded to the time a subsequent full pump stroke is commanded. While the fuel rail pressure will significantly vary upon execution of the full pump stroke, the mean fuel rail pressure remains constant throughout the suitable time interval. In some examples, fuel pump A may be controlled to achieve an approximately constant mean fuel rail pressure—e.g., small deviations in the fuel pressure (e.g., less than 1%) may be tolerated.

At 406 of routine 400, a fuel amount to be injected by a single injector in fuel rail A is determined. The single injector may be one of a group of injectors positioned in fuel rail A (e.g., fuel injector 214a of FIG. 2), and in some examples, may be the first of a sequence of fuel injectors in the fuel rail. As described in further detail below, a fuel amount to be injected is specifically determined for the single injector so that flow errors specific to that injector may be identified. Routine 400 may be repeated for injectors other than the single injector (e.g., the remaining injectors in fuel rail A and/or one or more injectors in fuel rail B). A control unit such as control unit 226 (FIG. 2) may determine the fuel amount to be injected based on various criteria described above (e.g., engine speed, engine load, etc.). The control unit may then issue the determined fuel amount to be injected as a fuel injector command to the single fuel injector. As such, different fuel amounts may be injected at different times. In some examples, however, the same fuel amounts may be injected by a given fuel injector for diagnostic purposes.

At 408 of routine 400, the fuel amount to be injected determined at 406 is injected by the single injector and not the other injectors in fuel rail A. By injecting fuel via the single injector and not the other injectors in fuel rail A, fuel metering inaccuracy specific to the single injector may be identified and/or compensated.

At 410 of routine 400, reduced fuel injection resulting from injecting fuel by the single injector and not the other injectors in fuel rail A (e.g., due to deactivation of the other injectors) is compensated by operating fuel pump B and injecting fuel via one or more injectors positioned in fuel rail B. Full, minimum, and other pump stroke commands therebetween may be issued to fuel pump B according to various engine operating conditions described above. It will be appreciated that fuel pump B may be operated before, during, and/or after injecting fuel via the single fuel injector in fuel rail A, for example according to the fuel pressure in fuel rail B to sustain a desired fuel rail pressure therein. Alternatively or additionally, one or more port fuel injectors in fuel rail B may be operated to compensate reduced fuel injection if they are included.

At 412 of routine 400, it is determined whether the fuel pressure in fuel rail A is less than a threshold pressure. Fuel pressure in fuel rail A may be determined based on output from fuel pressure sensor 220A, for example. If it is determined that the fuel pressure in fuel rail A is less than the threshold pressure (YES), routine 400 proceeds to 414. If it is determined that the fuel pressure in fuel rail A is not less than the threshold pressure (NO), routine 400 returns to 408. The threshold pressure may be adjusted to provide desired injector operation and a desired number of injection events by the single injector, as the single injector will be commanded to inject the determined fuel amount on an iterative basis until the fuel pressure in fuel rail A falls below the threshold pressure. The desired number of injection events may be selected to achieve accurate fuel injector characterization while maintaining desired engine operation—e.g., eleven injection events may be selected. In some embodiments, however, a determination as to whether the desired number of injection events has occurred may be made alternatively or in addition to the determination made at 412.

At 414 of routine 400, it is determined whether the number of full pump strokes performed by fuel pump A during a characterization period is greater than or equal to a threshold number of full pump strokes. As with the desired number of injection events, the number of full pump strokes may be adjustable and selected to provide accurate fuel pump characterization while maintaining desired engine operation—e.g., three full pump strokes may be selected. The characterization period as used herein refers to the period in which operation of the single injector is characterized (e.g., from the time the other fuel injectors are deactivated to the time they are reactivated). FIG. 5, described below, shows one such example of a characterization period. If it is determined that the number of full pump strokes is not greater than or equal to the threshold number of full pump strokes (NO), routine 400 returns to 402. If it is determined that the number of full pump strokes is greater than or equal to the threshold number of full pump strokes (YES), routine 400 proceeds to 416. In this way, fuel pump A may be commanded to perform full pump strokes on an iterative basis until the threshold number of full pump strokes is reached.

Figure 4B:
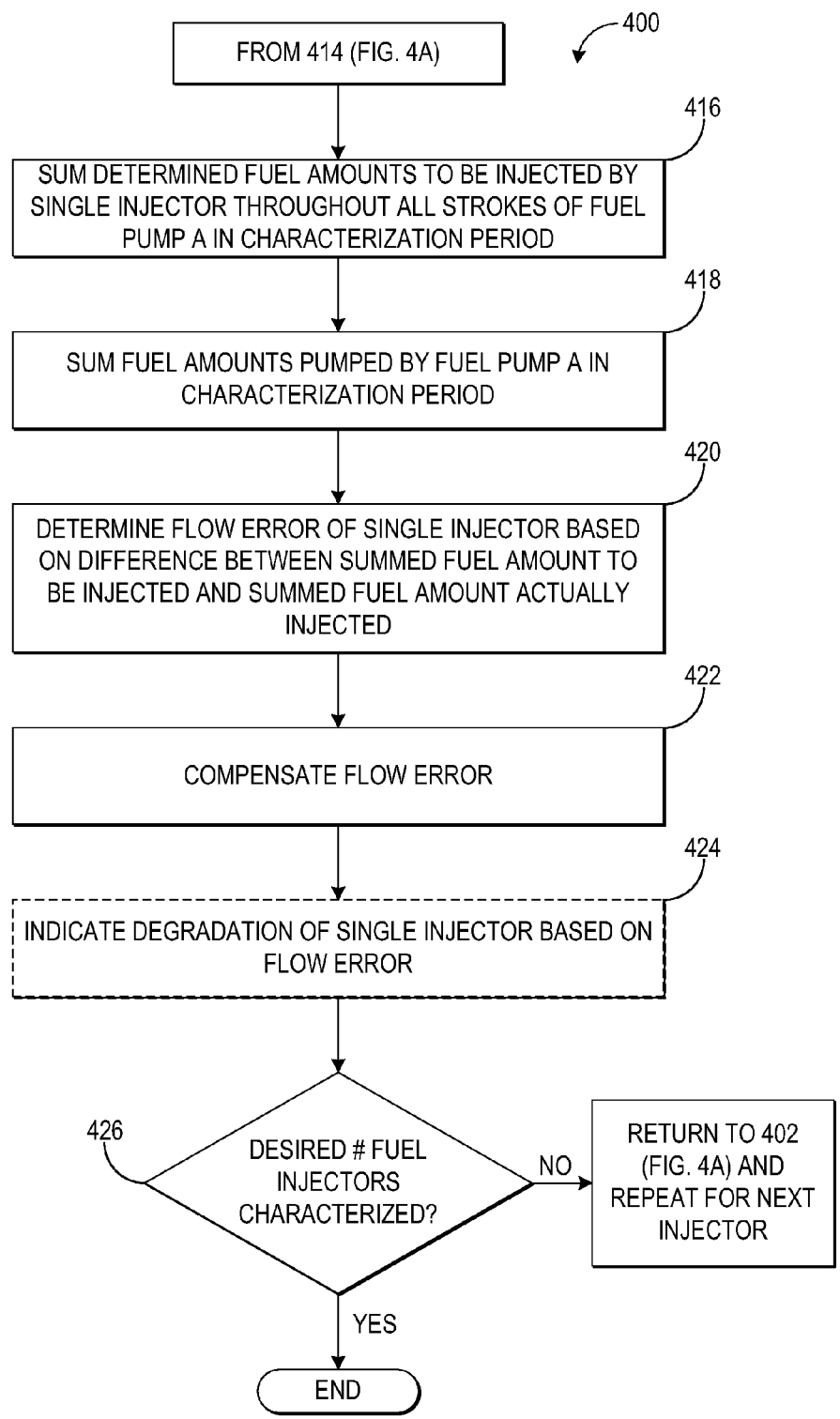

Continuing with FIG. 4B, at 416 of routine 400, the determined fuel amounts to be injected by the single injector throughout all strokes of fuel pump A in the characterization period are summed. The determined fuel amounts to be injected are summed to determine a total fuel injector command (e.g., total commanded or computed fuel amount to be injected) during the characterization period.

At 418 of routine 400, the fuel amounts pumped by fuel pump A in the characterization period are summed. As described above, fuel amounts pumped into fuel rail A by fuel pump A may be determined based on predetermined data indicating one or more pumped fuel amounts (e.g., volumes) pumped into the fuel rail as a result of commanding corresponding pump strokes. The predetermined data may be determined offline in a testing environment, for example. In other implementations, however, output from the fuel pressure sensor in fuel rail A may be used in addition to or in lieu of such predetermined data.

At 420 of routine 400, the flow error of the single injector is determined based on a difference between the summed fuel amount to be injected (e.g., injector commands summed at 416) and the summed fuel amount actually injected (e.g., pumped fuel amounts summed at 418). The flow error represents the discrepancy between commanded fuel amounts (e.g., injector commands) and actual fuel amounts injected in response to the commanded fuel amounts.

At 422 of routine 400, the flow error determined at 420 is compensated. In some examples, compensation of the flow error may include adjusting subsequently commanded fuel amounts to be injected by the single injector—e.g., adjusting subsequent injector commands. This may include adjusting fuel signals (e.g., adjusting the pulse width of dfpw signals) sent to the single injector. As a specific example, the pulse width of signals sent to the single injector may be increased to cause the injection of a relatively greater amount of fuel if the flow error indicates that the single injector injected a fuel amount less than the amount commanded. Conversely, the pulse width of signals sent to the single injector may be decreased to cause the injection of a relatively lesser amount of fuel if the flow error indicates that the single injector injected a fuel amount greater than the amount commanded. Once the flow error for the single injector is determined, adjustment of fuel injection signals sent to the single injector in this manner may be performed by storing signal adjustments in a lookup table accessed by using the initial signals as input, for example.

At 424 of routine 400, degradation of the single actuator may be optionally indicated based on the flow error determined at 420. In some examples, flow errors whose absolute values that exceed a threshold flow error may prompt indication of degradation. Injector degradation may be indicated as a result of interpreting a flow error caused by a lower fuel pressure drop than expected as clogging in the fuel injector. In another example, interpretation may be a function of pulse width—e.g., if the fuel pressure drop is lower than expected at small pulse widths (e.g., a short amount of time between each injection in a sequence of injections), the injector may be opening at a speed less than a nominal speed. In yet another example, if the fuel pressure drop is higher than expected, the injector may be at least partially stuck open. As another example, if the fuel pressure drop is higher than expected at small pulse widths, the injector may be closing at a speed less than a nominal speed. In some implementations, indicating degradation of the single injector may include warning a vehicle operator via a dashboard indicator and/or setting a diagnostic code, for example.

At 426 of routine 400, it is determined whether a desired number of fuel injectors have been characterized. In some examples, this may include determining whether flow errors for the desired number of fuel injectors have been characterized. The desired number of fuel injectors may be adjustable and selected based on various criteria—e.g., in some scenarios, all fuel injectors in fuel rail A may be characterized as part of a sequential diagnostic procedure, which may be periodic (e.g., scheduled every given number of miles). In other scenarios, prior indication or suggestion of degraded operation of a fuel injector may prompt its characterization and not characterization of the other injectors. In some examples, one or more fuel injectors in fuel rail B may be characterized in addition or alternatively to those in fuel rail A. In this example, routine 400 may be performed analogously for fuel rail B—e.g., fuel pump B may be fully pumped and thereafter suppressed, with commanded fuel injection amounts for an injector in fuel rail B compared to the fuel volume pumped into fuel rail B based on predetermined data and/or fuel pressure sensor readings. Generally, one, all, or any number therebetween of fuel injectors may be characterized according to routine 400. Accordingly, if it is determined that the desired number of fuel injectors have not been characterized (NO), routine 400 returns to 402, where characterization of the next fuel injector begins. If it is determined that the desired number of fuel injectors have been characterized (YES), routine 400 ends. Upon routine 400 ending, nominal fuel injection may resume according to various engine operating conditions—e.g., fuel pumping suppression may be terminated, fuel injection by fuel injectors other than the injector being immediately previously characterized may resume, etc.

FIG. 5 shows a plot 502 of fuel pressure and a plot 504 of fuel volume sum, both as functions of time, for an example fuel injector characterization period indicated at 506. Plots 502 and 504 may result from the execution of routine 400 throughout characterization period 506, for example. At the start of characterization period 506, a fuel pump A in a fuel system comprising fuel pumps A and B is operated to perform full pump strokes in response to fuel pressure in its associated fuel rail A falling below a threshold pressure. As such, the fuel pressure in fuel rail A, shown in plot 502, rapidly increases, as indicated at 508. Thereafter, until the fuel pressure in fuel rail A falls below a threshold pressure, pumping by fuel pump A is suppressed. Between the full pump stroke indicated at 508 and the following full pump stroke indicated at 510, a single fuel injector in fuel rail A is controlled to inject a determined fuel amount, which in this example results in eleven iterative injections each producing a corresponding drop in fuel pressure in fuel rail A. During this time, fuel injection by the single fuel injector in fuel rail A is allowed, while fuel injection by the other injectors in fuel rail A is disallowed. Also during this time, fuel injectors in fuel rail B may be operated to compensate the reduced fuel injection resulting from allowing injection by the single fuel injector in fuel rail A and disallowing injection by the other injectors in fuel rail A. While the fuel amounts injected by the single fuel injector in fuel rail A may be the same, in other examples different fuel amounts may be injected by the same injector during its characterization.

In this example, a desired number of full pump strokes performed by fuel pump A during characterization period 506 is set to three, resulting in the performance of three full pump strokes respectively indicated at 508, 510, and 512. Fuel pump A is further controlled such that a constant mean fuel pressure in fuel rail A is achieved, as indicated at 514. Due to the values to which the desired number of full pump strokes and fuel rail A threshold pressure are set, thirty-three total fuel injections are performed by the single fuel injector in fuel rail A.

Once the desired number of full pump strokes is achieved in characterization period 506, the fuel amounts commanded to be injected by the single fuel injector in fuel rail A are summed for all full pump strokes commanded in the characterization period. Plot 504 shows the change in sum commanded fuel volume to be injected by the single injector at each injection. Further, the fuel amounts pumped by fuel pump A in characterization period 506 are summed, the fuel amounts determined on known pumped fuel amounts resulting from corresponding pump stroke commands as described above. The sum commanded fuel amounts may then be compared to the sum fuel amount pumped to determine a flow error of the single injector. An example flow error is indicated in FIG. 5 at 516. This flow error may be compensated in various suitable ways. In the example illustrated in FIG. 5, the flow error is such that a smaller fuel volume than commanded is actually injected by the single injector. As such, compensating its flow error may include adjusting fuel injection commands sent to the single injector (e.g., increasing their pulse width) so that relatively larger fuel amounts are injected. Moreover, degradation of the single injector may be optionally indicated. Following characterization of the single injector, one or more additional fuel injectors may be characterized in an analogous manner.

It will be appreciated that plots 502 and 504 are provided as examples and are not intended to be limiting in any way. In some examples, plot 502 may represent fuel pressure changes in a fuel rail resulting from injection by two or more fuel injectors. Further, while the flow error of the single fuel injector in fuel rail A is determined after the desired number of full pump strokes has been performed, in other examples flow errors may be determined after each full pump stroke. In this example, the flow errors determined at each full pump stroke may be compared until the flow errors converge to some number to a desired level, at which point the total flow error may be considered to have been determined with sufficient accuracy.

Thus, as shown and described, routine 400 may be executed to characterize fuel injector operation, identify flow errors in fuel injectors, and compensate any identified flow errors to increase the accuracy of fuel metering by the fuel injectors. Moreover, these results may be achieved without unacceptably affecting engine operation by compensating reduced fuel injection, and without confounding multiple factors that affect fuel rail pressure. In some scenarios, routine 400 may be used to characterize differences among fuel injectors and individually compensate their flow errors.

It will be appreciated that routine 400 may be modified without departing from the scope of this disclosure. For example, in some implementations, additional data such as the fuel stored in a fuel rail due to its fuel rail pressure may be considered in characterizing its associated fuel injectors. The fuel stored in the fuel rail may be computed according to a difference in fuel rail pressure divided by the bulk modulus of the fuel in the fuel rail, with this quotient being multiplied by the fuel rail volume, for example.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of characterizing fuel injector operation, comprising:
indicating a flow error of a single fuel injector of two or more fuel injectors positioned in a first fuel rail by comparing a sum of each of a plurality of injector commands for the single injector to a fuel amount pumped into the first fuel rail, the fuel amount being predetermined;
wherein all other fuel injectors, except the single fuel injector, of the two or more fuel injectors are maintained deactivated between the plurality of injector commands.

2. The method of claim 1, wherein the fuel amount pumped into the first fuel rail is a fuel volume.

3. The method of claim 1, wherein each of a plurality of injections is performed between successive full pump strokes performed by a fuel pump, the fuel pump supplying fuel to the two or more fuel injectors in the first fuel rail.

4. The method of claim 3, wherein each of the plurality of injections occurs after the fuel pump has performed a full pump stroke and pumping by the fuel pump following the full pump stroke has been suppressed.

5. The method of claim 4, further comprising commanding the fuel pump to perform the full pump stroke if a fuel pressure in the first fuel rail falls below a threshold pressure.

6. The method of claim 1, wherein, during one or more of a plurality of injections, one or more fuel injectors positioned in a second fuel rail are operated to compensate reduced engine fueling caused by deactivation of the other injectors in the first fuel rail, the compensating including delivering fuel with the one or more fuel injectors position in the second fuel rail.

7. The method of claim 6, wherein the two or more fuel injectors positioned in the first fuel rail are supplied fuel by a first fuel pump,
wherein the one or more fuel injectors positioned in the second fuel rail are supplied fuel by a second fuel pump; and
wherein the fuel delivered with the one or more fuel injectors positioned in the second fuel rail is a second fuel, the second fuel different from a first fuel in the first fuel rail.

8. The method of claim 1, wherein the two or more fuel injectors positioned in the first fuel rail are supplied fuel by a fuel pump controlled to achieve a constant mean fuel pressure in the first fuel rail.

9. The method of claim 1, further comprising compensating the flow error by adjusting subsequent injector commands sent to the single fuel injector based on the indicated flow error.

10. The method of claim 1, further comprising determining respective flow errors of the other fuel injectors positioned in the first fuel rail, wherein the predetermined fuel amount is delivered to the first fuel rail with a plurality of full pump strokes including a first pump stroke and a last pump stroke, and wherein fuel pumping is suppressed between each full pump stroke in the plurality of full pump strokes.

11. The method of claim 10, wherein, during each of a plurality of injections, the single fuel injector, and not the other fuel injectors, injects fuel into an engine cylinder, wherein the plurality of injector commands occur between the first and last pump stroke, and wherein each full pump stroke occurs in response to fuel pressure in the first fuel rail falling below a threshold.

12. A method of characterizing fuel injector operation, comprising:
during a characterization period,
commanding a fuel pump to output a full pump stroke, and suppressing pumping by the fuel pump thereafter, the fuel pump supplying fuel to a first fuel rail in which two or more fuel injectors are positioned;
in response to the full pump stroke, commanding only a single fuel injector of the two or more fuel injectors, and not the other fuel injectors, with a plurality of injector commands until a fuel pressure drops below a threshold; and
determining a flow error of the single fuel injector by comparing the plurality of injector commands to a fuel amount pumped into the first fuel rail by the fuel pump, the fuel amount being predetermined; wherein the characterization period lasts from a time when the other fuel injectors are deactivated to a time when the other fuel injectors are reactivated.

13. The method of claim 12, wherein determining the flow error of the single fuel injector includes comparing a sum of the plurality of injector commands to the fuel amount pumped into the first fuel rail.

14. The method of claim 12, wherein the fuel pump is a first fuel pump, the method further comprising compensating reduced fuel injection due to deactivation of the other fuel injectors in the first fuel rail by injecting fuel via one or more fuel injectors positioned in a second fuel rail.

15. The method of claim 14, wherein the plurality of injector commands cause fuel injection into a single engine cylinder, the one or more fuel injectors in the second fuel rail injecting the fuel into the single engine cylinder, and wherein the first fuel rail and the second fuel rail contain different fuels.

16. The method of claim 12, wherein the two or more fuel injectors are direct fuel injectors.

17. A method of characterizing fuel injector operation, comprising:
while fuel pumping by a fuel pump is suppressed, injecting a plurality of fuel amounts via a single fuel injector of two or more fuel injectors, and not the other fuel injectors;
summing the plurality of fuel amounts and comparing the sum to a total fuel volume, the total fuel volume based on predetermined data; and
indicating a flow error of the single fuel injector based on the comparison.

18. The method of claim 17, wherein the two or more fuel injectors are positioned in a first fuel rail,
wherein the fuel pump is a first fuel pump supplying fuel to the first fuel rail, the method further comprising injecting fuel via one or more fuel injectors positioned in a second fuel rail while the other fuel injectors in the first fuel rail do not inject fuel, and
wherein the first and second fuel rails contain different fuels.

19. The method of claim 17, wherein the plurality of fuel amounts are supplied by a full pump stroke performed by the fuel pump, and wherein the other fuel injectors are maintained deactivated during the injecting of the plurality of fuel amounts.

20. The method of claim 17, further comprising compensating the flow error by adjusting injector commands sent to the single injector based on the flow error, and wherein injecting a plurality of fuel amounts occurs until a fuel pressure drops below a threshold.

* * * * *